United States Patent Office 3,055,893
Patented Sept. 25, 1962

3,055,893
4 - [6 - ALKOXY - 1 - CARBOXY - 1,2,3,4,4a,9,10,10a-OCTAHYDRO - 1,4a - DIMETHYL - 9 - OXO - 7-PHENANTHRENE (ACYL/THIONOACYL)] MORPHOLINES AND ESTERS THEREOF
Roy H. Bible, Jr., Morton Grove, Ill., assignor to G. D. Searle & Co., Chicago, Ill., a corporation of Delaware
No Drawing. Filed Aug. 12, 1960, Ser. No. 49,171
8 Claims. (Cl. 260—247.2)

This invention relates to 4-[1-carboxy-1,2,3,4,4a,9,10,10a-octahydro - 1,4a - dimethyl-9-oxo-6-oxy-7-phenanthrene(acyl/thionoacyl)]morpholines, esters corresponding, and processes for the manufacture thereof. More particularly, this invention relates to chemical compounds of the formula

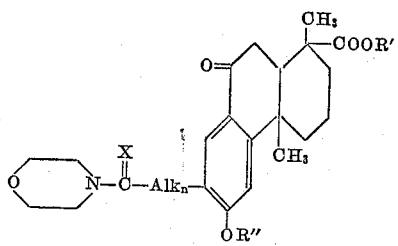

wherein R' and R" each represent hydrogen or an alkyl radical, Alk represents an alkylene radical, $n$ represents 0 or the positive integer 1, and X represents oxygen or sulfur.

Among the alkyl radicals represented by R' and R", especially lower alkyl radicals are preferred, illustratively methyl, ethyl, propyl, butyl, isobutyl, sec-butyl, tert-butyl, pentyl, isopentyl, tert-pentyl, neopentyl, hexyl, isohexyl, heptyl, octyl, and homologous groupings embracive of fewer than 9 carbon atoms.

The alkylene radicals comprehended by Alk are likewise optimally of lower order, for example, methylene, ethylene, trimethylene, propylene, tetramethylene, pentylene, and such other bivalent saturated acyclic straight- or branched-chain hydrocarbon groupings as may be thought of as derived from a lower alkyl radical by removal of 1 atom of hydrogen.

Those skilled in the art will appreciate that when $n$ in the foregoing formula represents 0 the Alk term drops out and the morpholines represented are 7-phenanthrene (carboxylic/thiocarboxylic) acid derivatives.

The compounds to which this invention relates are useful because of their valuable pharmacological properties. Thus, for example, they are antibiotics adapted to inhibit the growth of bacteria such as E. coli; and they are diuretics characterized by a capacity to block the effect of desoxycorticosterone acetate on urinary sodium and potassium. They are also anti-androgens.

Manufacture of the subject compounds proceeds by oxidation in an inert medium with chromium trioxide and an acid such as acetic or sulfuric of a corresponding 9-methylenic compound

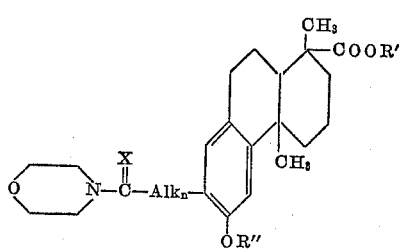

in the formula of which R', R", Alk, $n$, and X are defined as before. The phenanthreneacylmorpholines which result are converted ad libitum to phenanthrene-thionoacylmorpholines by heating with phosphorus pentasulfide in benzene solution, the product being isolated by chromatography on silica gel.

Alternatively, the compounds of this invention are manufactured via the Kindler modification of the Willgerodt procedure as applied to 7-carbonylphenanthrenes of the formula

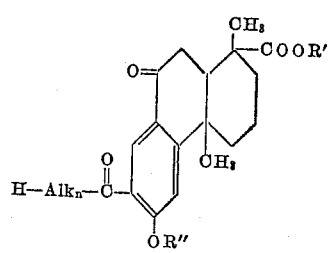

wherein R', R", Alk, and $n$ have the same meanings assigned above, the phenanthrenethionoacylmorpholines thus obtained being converted to phenanthreneacylmorpholines as desired by contacting with chromium trioxide and a suitable acid in an inert medium.

From the 1 - carboxyphenanthreneacylmorpholines hereof are produced corresponding esters by heating with a dialkyl sulfate and an alkali metal hydroxide in a lower alkanol.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are at 25° C. referred to the D line of sodium.

Example 1

4 - (1,2,3,4,4a,9,10,10a - octahydro - 6 - methoxy - 1-methoxycarbonyl - 1,4a - dimethyl - 9 - oxo - 7 - phenantreneacetyl)-morpholine.—To a mixture of 10 parts of 4 - (1,2,3,4,4a,9,10,10a - octahydro - 6 - methoxy - 1-methoxycarbonyl - 1,4a - dimethyl - 7 - phenanthrene-thionacetyl)morpholine and 120 parts of acetone is added, with agitation at room temperatures during 30 minutes, a solution of 7 parts of chromium trioxide dissolved in 12 parts of water diluted with 10 parts of concentrated sulfuric acid. When the addition is complete, approximately 10 volumes of water is incorporated; and the solid precipitate thrown down is collected on a filter and recrystallized from a mixture of acetone and hexane. The 4 - (1,2,3,4,4a,9,10,10a - octahydro - 6 - methoxy - 1-methoxycarbonyl - 1,4a - dimethyl - 9 oxo - 7 - phenantreneacetyl)morpholine thus obtained melts at 218.5–220°. It has the formula

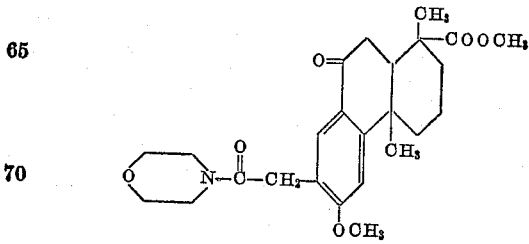

Example 2

4-(1 - ethoxycarbonyl - 1,2,3,4,4a,9,10,10a - octahydro - 6 - methoxy - 1,4a - dimethyl - 9 - oxo - 7 - phenanthreneacetyl)morpholine.—Substitution of 10 parts of 4 - (1 - ethoxycarbonyl - 1,2,3,4,4a,9,10,10a - octahydro - 6 - methoxy - 1,4a - dimethyl - 7 - phenanthreneacetyl)morpholine for the 4-(1-methoxycarbonyl-1,2,3,4,4a,9,10,10a - octahydro - 6 - methoxy - 1,4a - dimethyl - 7 - phenanthrenethionoacetyl)morpholine called for in Example 1 affords, by the procedure there detailed, 4-(1-ethoxycarbonyl - 1,2,3,4,4a,9,10,10a - octahydro - 6 - mehoxy-1,4a-dimethyl-9-oxo-7 - phenanthreneacetyl) - morpholine of the formula

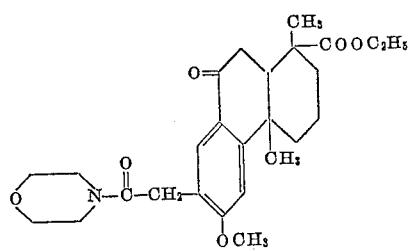

Example 3

4 - (6 - ethoxy - 1 - ethoxycarbonyl - 1,2,3,4,4a,9,10,10a - octahydro - 1,4a - dimethyl - 9 - oxo - 7 - phenanthreneacetyl)morpholine.—Substitution of 10 parts of 4-(6 - ethoxy - 1 - ethoxycarbonyl - 1,2,3,4,4a,9,10,10a-octahydro - 1,4a - dimethyl-7-phenanthrenethionoacetyl)morpholine for the 4-(1,2,3,4,4a,9,10,10a-octahydro-6-methoxy - 1 - methoxycarbonyl - 1,4a - dimethyl-7-phenanthrenethionoacetyl)morpholine called for in Example 1 affords, by the procedure there detailed, 4-(6-ethoxy-1-ethoxycarbonyl - 1,2,3,4,4a,9,10,10a - octahydro - 1,4a-dimethyl - 9 - oxo - 7 - phenanthreneacetyl)morpholine. The product has the formula

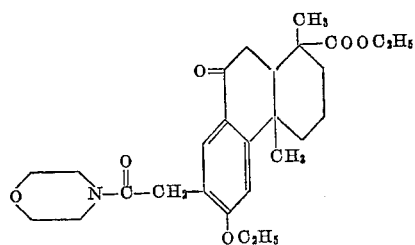

Example 4

4-(1,2,3,4,4a,9,10,10a - octahydro - 6 - methoxy - 1-methoxycarbonyl - 1,4a - dimethyl - 9 - oxo - 7 - phenanthrenepropionyl)morpholine.—To a slurry of 15 parts of 4 - (1,2,3,4,4a,9,10,10a - octahydro - 6 - methoxy-1-methoxycarbonyl - 1,4a - dimethyl - 7 - phenanthrenethionopropionyl)morpholine in 160 parts of acetic acid and 20 parts of water at 9–13° is added, with agitation during 1 hour, 13 parts of chromium trioxide dissolved in 7 parts of water diluted with 13 parts of acetic acid. The resultant mixture is let stand overnight at room temperatures and then diluted with 1000 parts of aqueous 5% ethanol. The mixture thus obtained is distilled to ½ its original volume and then extracted with ether. The ether extract is successively washed with water, aqueous 10% sodium hydroxide, and water, following which it is dried over anhydrous sodium sulfate and finally stripped of solvent by distillation. The light yellow solid residue is taken up in benzene, and the benzene solution is chromatographed on silica gel, using benzene and ethyl acetate as developing solvents. From the eluate comprising 50% ethyl acetate in benzene is obtained 4-(1,2,3,4,4a, 9,10,10a - octahydro - 6 - methyl - 1 - methoxycarbonyl-1,4a - dimethyl - 9 - oxo - 7 - phenanthrenepropionyl)morpholine which, recrystallized from aqueous methanol, melts at 153–154.5°. The product has the formula

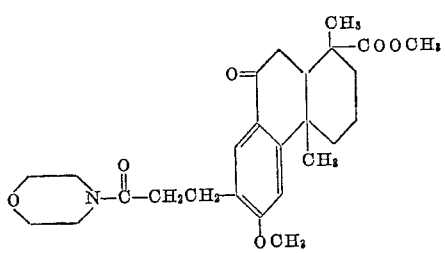

Example 5

4-(1-carboxy-1,2,3,4,4a,9,10,10a-octahydro-6-methoxy-1,4a - dimethyl-9-oxo-7-phenanthrenepropionyl)-morpholine.—Substitution of 15 parts of 4-(1-carboxy-1,2,3,4, 4a,9,10,10a - octahydro - 6 - methoxy-1,4a-dimethyl-7-phenanthrenethionopropionyl)morpholine for the 4-(1,2, 3, 4, 4a, 9,10,10a - octahydro - 6 - methoxy-1-methoxycarbonyl - 1,4a-dimethyl-7-phenanthrenethionopropionyl)morpholine called for in Example 4 affords, by the procedure there detailed modified solely to the extent that the aqueous 10% sodium hydroxide wash (column 3, lines 69, 70) is omitted, 4-(1-carboxy-1,2,3,4,4a,9,10,10a-octahydro-6-methoxy-1,4a-dimethyl - 9 - oxo-7-phenanthrenepropionyl)morpholine, of the formula

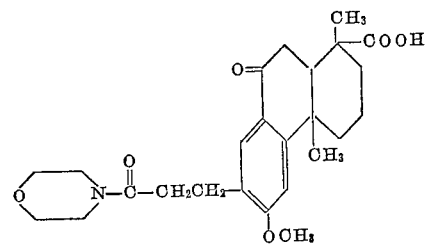

Example 6

4 - (1,2,3,4,4a,9,10,10a - octahydro - 6 - methoxy-1-methoxycarbonyl - 1,4a - dimethyl-9-oxo-7-phenanthrenethionoacetyl)morpholine.—A mixture of 25 parts of 7-acetyl-1,2,3,4,4a,9,10,10a-octahydro-6-methoxy - 1 - methoxycarbonyl-1,4a-dimethyl-9-oxophenanthrene, 2 parts of sulfur, and 6 parts of morpholine is heated at approximately 150° for 10 hours. The resulting mixture is taken up in benzene; and the benzene solution is chromatographed on silica gel, using benzene and ethyl acetate as developing solvents. From eluates comprising 15% ethyl acetate and 85% benzene, on evaporation of solvent, there is obtained 4 - (1,2,3,4,4a,9,10,10a - octahydro-6-methoxy-1-methoxycarbonyl - 1,4a - dimethyl-9-oxo-7-phenanthrenethionoacetyl)morpholine as the residue which, recrystallized from aqueous methanol, melts at 180.5–183.5° and is further characterized by a specific rotation of +57°. The product has the formula

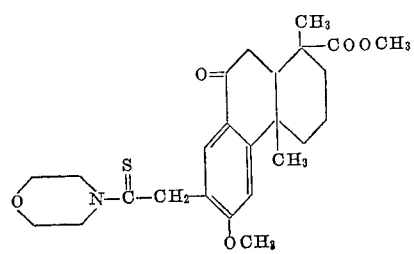

What is claimed is:

1. A compound of the formula

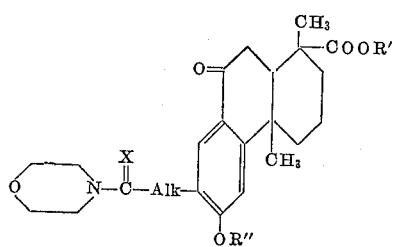

wherein R' is selected from the group consisting of hydrogen and alkyl radicals of the formula $$-C_mH_{2m+1}$$

in which $m$ is a positive integer less than 9, R" is an alkyl radical of the formula $$-C_mH_{2m+1}$$

in which $m$ has the same meaning assigned above, Alk is an alkylene radical of the formula $$-C_mH_{2m}-$$

in which $m$ again has the same meaning assigned above, and X is selected from the group consisting of oxygen and sulfur.

2. A compound of the formula

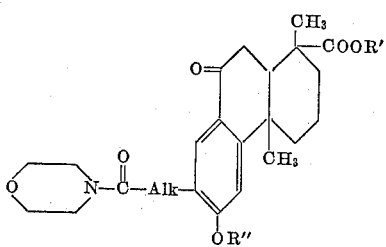

wherein R' and R" are alkyl radicals of the formula $$-C_mH_{2m+1}$$

and Alk is an alkylene radical of the formula $$-C_{m'}H_{2m'}-$$

$m$ and $m'$ being positive integers less than 9.

3. A compound of the formula

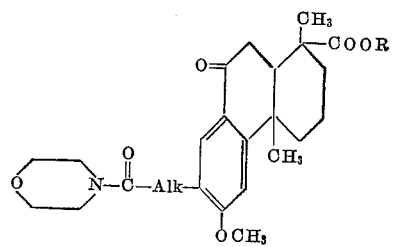

wherein R is an alkyl radical of the formula $$-C_mH_{2m+1}$$

and Alk is an alkylene radical of the formula $$-C_{m'}H_{2m'}-$$

$m$ and $m'$ being positive integers less than 9.

4. A compound of the formula

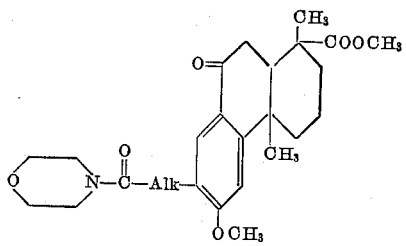

wherein Alk is an alkylene radical of the formula $$-C_mH_{2m}-$$

$m$ being a positive integer less than 9.

5. 4 - (1,2,3,4,4a,9,10,10a-octahydro-6-methoxy-1-methoxycarbonyl - 1,4a - dimethyl - 9-oxo-7-phenanthreneacetyl)-morpholine.

6. 4 - (1,2,3,4,4a,9,10,10a - octahydro-6-methoxy-1-methoxycarbonyl - 1,4a - dimethyl - 9 - oxo-7-phenanthrenepropionyl)-morpholine.

7. 4 - (1 - carboxy-1,2,3,4,4a,9,10,10a-octahydro-6-methoxy - 1,4a - dimethyl - 9-oxo-7-phenanthrenepropionyl)-morpholine.

8. 4 - (1,2,3,4,4a,9,10,10a - octahydro-6-methoxy-1-methoxycarbonyl - 1,4a - dimethyl-9-oxo-7-phenanthrenethionoacetyl)morpholine.

References Cited in the file of this patent

UNITED STATES PATENTS

| | | |
|---|---|---|
| 2,901,487 | Elpern | Aug. 25, 1959 |
| 2,902,494 | Bible | Sept. 1, 1959 |
| 2,921,956 | Bible | Jan. 19, 1960 |
| 2,947,778 | Bible | Aug. 2, 1960 |

UNITED STATES PATENT OFFICE
CERTIFICATE OF CORRECTION

Patent No. 3,055,893                                September 25, 1962

Roy H. Bible, Jr.

It is hereby certified that error appears in the above numbered patent requiring correction and that the said Letters Patent should read as corrected below.

Column 2, line 47, for "threneacetyl)-morpholine", in italics, read -- threneacetyl)morpholine --, in italcis; line 59, for "-9 oxo-" read -- -9-oxo- --; column 3, line 12, for "-mehoxy-" read -- -methoxy- --; line 13, for "-phenanthreneacetyl)-morpholine" read -- -phenanthreneacetyl)morpholine --; column 4, line 2, for "-6-methyl-" read -- -6-methoxy- --; line 21, for "-phenanthrenepropionyl)-morpho-", in italics, read -- -phenanthrenepropionyl)morpho- --, in italics; line 26, for "-phenanthrenethionopropionyl)" read -- -phenanthrenethionopropionyl)- --; column 6, line 37, for "acetyl)-morpholine" read -- acetyl)morpholine --; line 40, for "propionyl)-morpholine" read -- propionyl)morpholine --.

Signed and sealed this 7th day of January 1964.

(SEAL)
Attest:

ERNEST W. SWIDER

Attesting Officer

EDWIN L. REYNOLDS
Acting Commissioner
of Patents